United States Patent
Saito (10) Patent No.: US 8,157,703 B2
(45) Date of Patent: Apr. 17, 2012

(54) POWER TRANSFER DEVICE

(75) Inventor: Tomohiro Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 518 days.

(21) Appl. No.: 12/398,935

(22) Filed: Mar. 5, 2009

(65) Prior Publication Data

US 2009/0227421 A1    Sep. 10, 2009

(30) Foreign Application Priority Data

Mar. 6, 2008    (JP) .................................. 2008-056559

(51) Int. Cl.
*B60W 10/00*    (2006.01)
*B60K 17/344*    (2006.01)

(52) U.S. Cl. .......................................... 477/83; 180/248
(58) Field of Classification Search .............. 477/70, 477/83, 84, 85, 86, 115; 180/248; 701/89
See application file for complete search history.

(56) References Cited

U.S. PATENT DOCUMENTS

| | | | | |
|---|---|---|---|---|
| 4,866,624 A | * | 9/1989 | Nishikawa et al. | 701/89 |
| 5,752,211 A | * | 5/1998 | Takasaki et al. | 701/69 |
| 5,954,778 A | * | 9/1999 | Rodrigues et al. | 701/69 |
| 6,009,968 A | * | 1/2000 | Kouno | 180/248 |
| 6,580,994 B2 | * | 6/2003 | Katayama et al. | 701/69 |
| 6,845,838 B2 | * | 1/2005 | Wakao et al. | 180/248 |
| 7,497,297 B2 | * | 3/2009 | Watson et al. | 180/248 |
| 2002/0033293 A1 | * | 3/2002 | Fukuda et al. | 180/250 |
| 2008/0288146 A1 | * | 11/2008 | Beechie et al. | 701/58 |

FOREIGN PATENT DOCUMENTS

| | | |
|---|---|---|
| JP | 10-6798 | 1/1998 |
| JP | 2003-011685 | 1/2003 |

* cited by examiner

*Primary Examiner* — Roger Pang
(74) *Attorney, Agent, or Firm* — Haynes and Boone, LLP (57) ABSTRACT

The object of the present invention is to suppress the generation of abnormal noise from a transmission system that occurs when a vehicle is turning. A front wheel output shaft is directly linked with the transmission system, and a rear wheel output shaft is linked to the transmission system via a transfer clutch. When the front wheel output shaft rpm Nf and the rear wheel output shaft rpm Nr separate from each other beyond a specified value ($\alpha 2$) while turning a corner, and then the accelerator pedal is released and the engine rpm Ne and turbine rpm Nt approach each other beyond a specified value ($\beta 2$), and then if vibration at a specified vibration frequency appears in the front wheel output shaft rpm Nf ($\gamma 2$), the duty ratio Rd of the clutch pressure control valve 52 is decreased ($\delta 2$). Next, as the duty ratio Rd decreases, when it is determined that vibration in the front wheel output shaft rpm Nf has been eliminated ($\epsilon 2$), normal slip control is restored, and control is performed so that the duty ratio Rd is increased again ($\zeta 2$). By doing this, it is possible to suppress vibration of the front wheel output shaft, and thus suppress the generation of abnormal noise from the transmission system.

8 Claims, 7 Drawing Sheets

POWER TRANSFER DEVICE

CROSS REFERENCE TO RELATED APPLICATIONS

This application claims priority under 35 U.S.C. 119 based upon Japanese Patent Application Serial No. 2008-056559, filed on Mar. 6, 2008. The entire disclosure of the aforesaid application is incorporated herein by reference.

FIELD OF THE INVENTION

The present invention relates to a power transfer device that distributes a driving force to main drive wheels and auxiliary drive wheels via a friction clutch mechanism.

BACKGROUND OF THE INVENTION

As a four-wheel drive vehicle that drives the front and rear wheels, there is a vehicle that varies the torque-distribution ratio of the front and rear wheels according to the driving conditions. This kind of four-wheel drive vehicle comprises: main drive wheels, which are on one of the front wheel side and the rear wheel side, to which the drive torque is directly transmitted from the transmission system; and auxiliary drive wheels, which are on the other one of the front wheel side and the rear wheel side, to which the drive torque is transmitted from the transmission system via a friction clutch mechanism, and controls the torque-distribution ratio of the front and rear wheels by adjusting the fastening strength of the friction clutch mechanism (for example, refer to Japanese patent application publication No. H10-6798 and Japanese patent application publication No. 2003-11685).

When a vehicle is turning, rotation difference occurs between the front and rear wheels, so in the case of a four-wheel drive vehicle in which the drivelines for the main drive wheel side and the auxiliary drive wheel side are connected, it becomes necessary to avoid the so-called tight-corner braking phenomenon by separating the drivelines for the main drive wheel side and auxiliary drive wheel side, and absorbing this rotation difference. Even though the rotation difference between the front and rear wheels is absorbed in this way, in order to avoid a drop in driving performance or a sudden change in torque, it becomes essential to gradually reduce the fastening force of the friction clutch mechanism and control the friction clutch mechanism in the slip state.

However, when attempting to control the friction clutch mechanism in the slip state, microscopic fastening and release of the friction plate is repeated, and there is a possibility that the so-called stick-slip phenomenon may occur. This kind of stick-slip phenomenon becomes the cause of vibration of the driveline on the auxiliary drive wheel side that has a small inertia force, and in a condition where the transmission state of the drive torque in the transmission becomes neutral, not only does this phenomenon cause vibration in the driveline of the auxiliary drive wheel side, but also causes vibration of the driveline of the main drive wheel side. When the driveline of the main drive wheel side vibrates in this way, it causes the transmission system that comprises a plurality of gears and the like to vibrate, as well as causes abnormal noise to be generated from the transmission system, so it is desired that vibration of the driveline of the main drive wheel side be suppressed.

SUMMARY OF THE INVENTION

The object of the present invention is to suppress vibration in the driveline of the main drive wheel that occurs when a vehicle is turning, as well as suppress abnormal noise that is generated from the transmission system.

The power transfer device of the present invention is a power transfer device that distributes a drive force that is output from a transmission system to a main drive wheel and an auxiliary drive wheel, comprising: a main drive side output shaft that is provided between the transmission system and the main drive wheel, and transmits drive force to the main drive wheel; an auxiliary drive side output shaft that is provided between the transmission system and the auxiliary drive wheel, and transmits drive force to the auxiliary drive wheel; a friction clutch mechanism that is provided between the transmission system and the auxiliary drive side output shaft, and controls the drive force that is distributed to the auxiliary drive wheel; a vibration judgment means for determining a vibration state in the main drive side output shaft based on the rotation state of the main drive side output shaft; and a clutch control means for decreasing the fastening force of the friction clutch mechanism based on the vibration state of the main drive side output shaft.

In the power transfer device of the present invention, the friction clutch mechanism is a hydraulic clutch mechanism, the fastening force of which is regulated by hydraulic oil whose pressure is regulated by a duty control valve; the vibration judgment means calculates the vibration frequency of the main drive side output shaft based on the rotation state of the main drive side output shaft; and the clutch control means decreases the fastening force of the friction clutch mechanism when the vibration frequency of the main drive side output shaft converges to a specified range that is set based on the drive frequency of the duty control valve.

The power transfer device of the present invention further comprises: a main drive side rotation sensor that detects the number of rotations of the main drive side output shaft; and an auxiliary drive side rotation sensor that detects the number of rotations of the auxiliary drive side rotation sensor; wherein the clutch control means decreases the fastening force of the friction clutch mechanism based on the vibration state of the main drive side output shaft when the difference in numbers of rotations between the main drive side output shaft and the auxiliary drive side output shaft is greater than a specified value.

The power transfer device of the present invention further comprises: a torque converter that is provided between a drive source and the transmission system, and transmits drive force from the drive source to the transmission system; an input side rotation sensor that detects the number of rotations of the input side of said torque converter; and an output side rotation sensor that detects the number of rotations of the output side of the torque converter; wherein the clutch control means decreases the fastening force of the friction clutch mechanism based on the vibration state of the main drive side output shaft when the rotation difference between the number of rotations of the input side and number of rotations of the output side is less than a specified value.

The power transfer device of the present invention further comprises: an acceleration request detection means for detecting an acceleration request from an operator; wherein the clutch control means decreases the fastening force of the friction clutch mechanism based on the vibration state of the main drive side output shaft when an acceleration request from an operator is less than a specified value.

The present invention comprises a main drive side output shaft that is linked to a transmission system, an auxiliary drive side output shaft that is linked to a transmission system via a friction clutch mechanism, and a clutch control means that decreases the fastening force of the friction clutch mechanism based on the vibration state of main drive side output shaft, so it is possible to suppress vibration of the main drive side output shaft, as well as suppress abnormal noise that is generated from the transmission system.

DETAILED DESCRIPTION OF THE INVENTION

Figure 1:
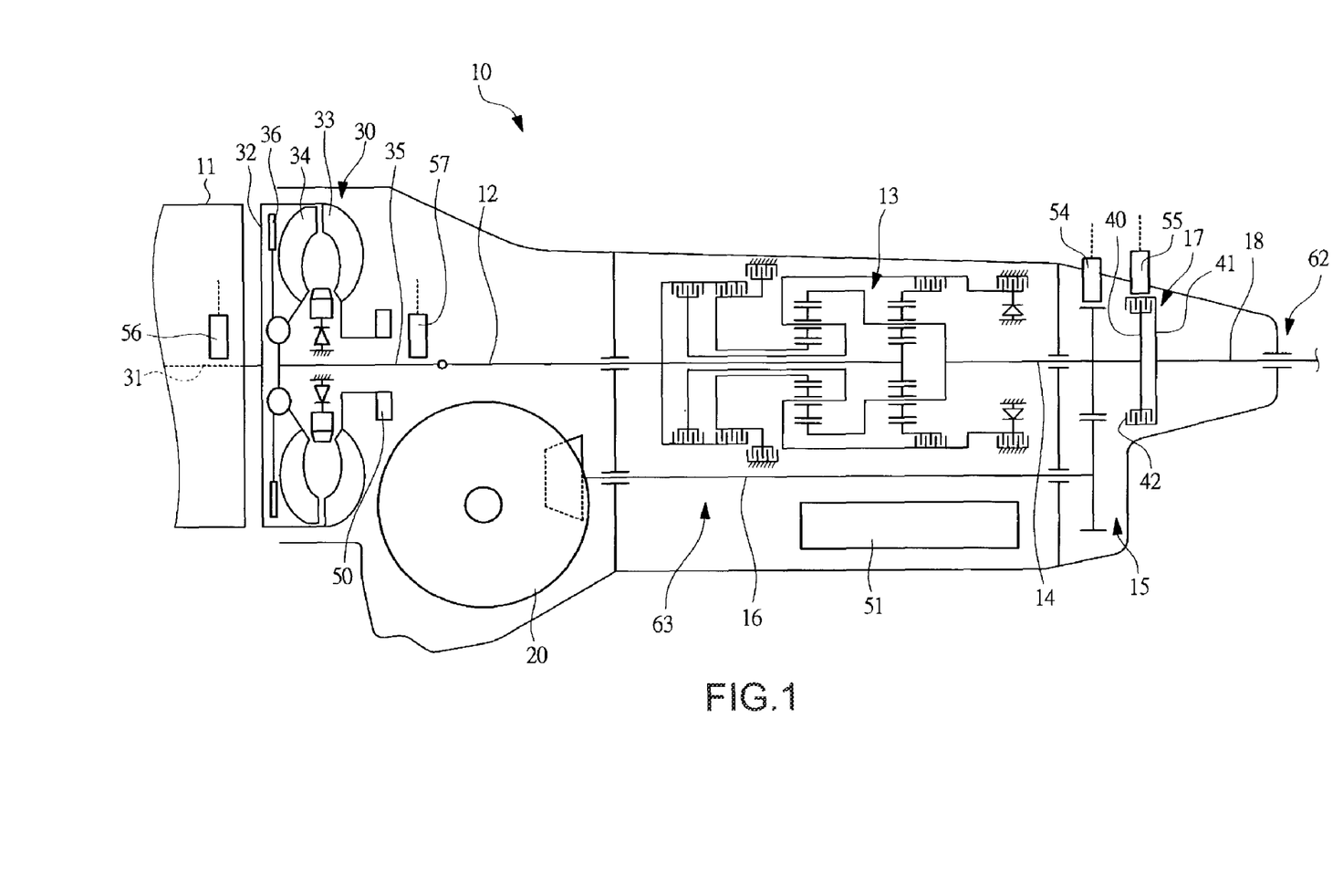
FIG. 1 is a skeleton drawing of an automatic transmission of a four-wheel drive vehicle that comprises a power transfer device of an embodiment of the present invention.

The preferred embodiments of the invention will be explained below with reference to the accompanying drawings. FIG. 1 is a skeleton drawing of an automatic transmission 10 of a four-wheel drive vehicle that comprises a power transfer device of an embodiment of the present invention. As shown in FIG. 1, the automatic transmission 10 comprises: a transmission input shaft 12 that is linked to the engine 11, which is the drive source; and a transmission output shaft 14 that is linked to the input shaft 12 via a transmission system 13. A front wheel output shaft 16, which is the output shaft of the main drive side, is linked to the transmission output shaft 14 via a gear train 15, and a rear wheel output shaft 18, which is the output shaft of the auxiliary drive side, is linked to the transmission output shaft 14 via a transfer clutch 17 (friction clutch mechanism, hydraulic clutch mechanism).

The drive force that is output from the transmission system 13 is transmitted from the front wheel output shaft 16 to the front wheels 21, which are main drive wheels, via a front differential mechanism 20. Moreover, the drive force that is output from the transmission system 13 is transmitted to the rear wheel output shaft 18 via the transfer clutch 17, and then is transmitted from the rear wheel output shaft 18 to the rear wheels 24, which are the auxiliary drive wheels, via a propeller shaft 22 and rear differential mechanism 23. In other words, by controlling the fastening force of the transfer clutch 17, it becomes possible to regulate the drive force that is distributed to the rear wheel 24 and to control the torque distribution ratio of the front and rear wheels 21, 24.

Moreover, the drive force is transmitted from the engine 11 to the transmission system 13 via a torque converter 30. The torque converter 30 comprises a pump impeller 33 that is linked to the crankshaft 31 via a front cover 32, and a turbine runner 34 that faces this pump impeller 33. In addition, a turbine shaft 35 is linked to the turbine runner 34, and one end of the transmission input shaft 12 is linked to the turbine shaft 35. In order to improve the efficiency of transmitting the engine power, a lock-up clutch 36 that directly links the crankshaft 31 and turbine shaft 35 is provided in the torque converter 30, which is a sliding element.

The transmission system 13 to which the drive force is transmitted via this kind of torque converter 30 comprises a plurality of planetary gear trains, a clutch and a brake etc. By controlling the clutch and brake that are assembled in this transmission system 13, it is possible to switch the transmission path of the drive force from the transmission input shaft 12 to the transmission output shaft 14, and make it possible to change the speed of the drive force that is transmitted from the transmission input shaft 12 to the transmission output shaft 14.

Figure 2:
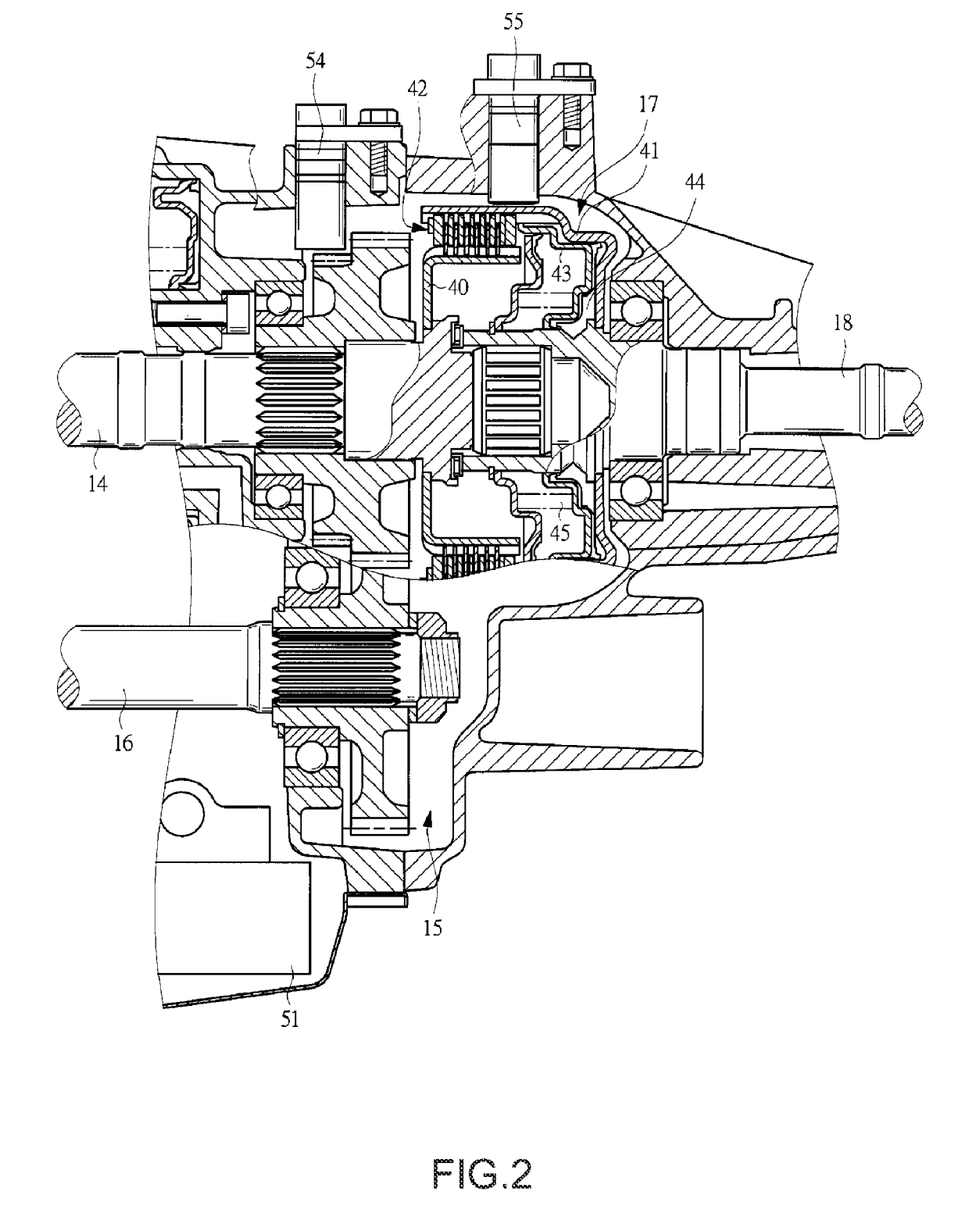
FIG. 2 is a cross-sectional drawing of a transfer clutch and surrounding area thereof.

FIG. 2 is a cross-sectional drawing of a transfer clutch and surrounding area thereof. As shown in FIG. 2, the transfer clutch 17 comprises a clutch hub 40 that is fastened to the transmission output shaft 14, and a clutch drum 41 that is fastened to the rear wheel output shaft 18. A plurality of clutch plates 42 are assembled between the clutch hub 40 and clutch drum 41, and a hydraulic piston 43 is housed inside the clutch drum 41 so that it can slide freely. By supplying hydraulic oil to the hydraulic chamber 44 that is partitioned off by the hydraulic piston 43 and clutch drum 41, the hydraulic piston 43 presses the clutch plate 42 and switches the fastening state of the transfer clutch 17. On the other hand, by discharging the hydraulic oil from the hydraulic chamber 44, a spring 45 releases the clutch plate 42 from the pressed state, which switches the transfer clutch 17 to the released state. In other words, the drive force that is transmitted to the rear wheel 24 is increased by increasing the hydraulic oil that is supplied to the hydraulic chamber 44, and the drive force that is transmitted to the rear wheel 24 is decreased by decreasing the hydraulic oil that is supplied to the hydraulic chamber 44.

Figure 3:
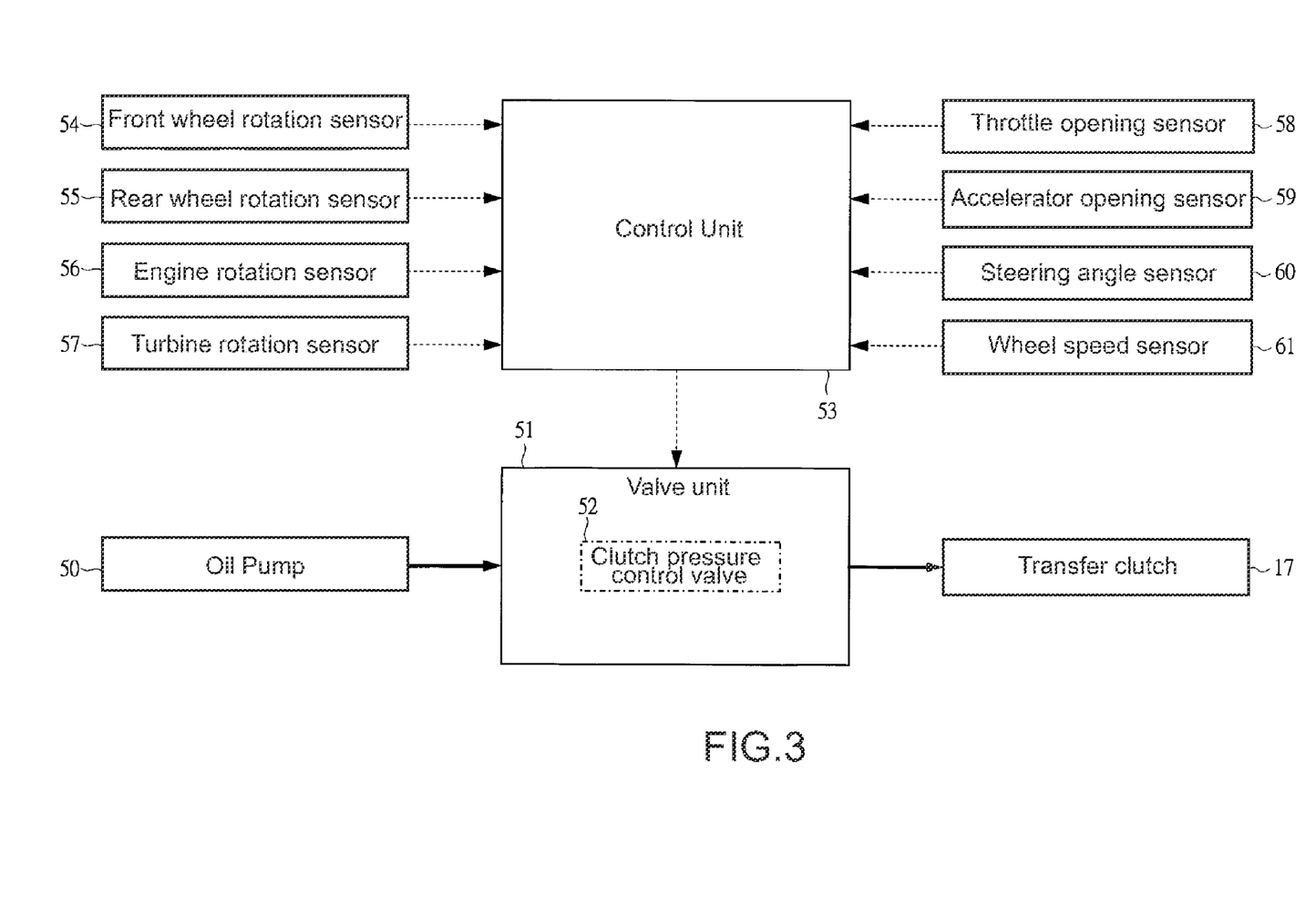
FIG. 3 is a block diagram of the control system of the transfer clutch.

Next, FIG. 3 is a block diagram of the control system of the transfer clutch 17. As shown in FIG. 3, the pressure of the hydraulic oil that is output from an oil pump 50 is regulated by a clutch pressure control valve 52 inside a valve unit 51 and then supplied to the hydraulic chamber 44 of the transfer clutch 17. By regulating the ratio (duty ratio Rd) between the conduction time and non-conduction time of a solenoid, this clutch pressure control valve 52 can function as a duty control valve for regulating the pressure of the hydraulic oil. That is, by having a control unit 53 control the duty ratio Rd of the clutch pressure control valve 52, it is possible to control the torque distribution ratio of the front and rear wheels 21, 24 by controlling the fastening force of the transfer clutch 17.

Moreover, a plurality of various sensors are connected to the control unit 53, which functions as a vibration judgment means and clutch control means, and based on the various signals that are input from the sensors, the control unit 53 sets the fastening force of the transfer clutch 17, as well as outputs a control signal to the clutch pressure control valve 52 at a duty ratio that corresponds to this setting. A front wheel rotation sensor (main drive side rotation sensor) 54 that detects the number of rotations of the front wheel output shaft 16, a rear wheel rotation sensor (auxiliary drive side rotation sensor) 55 that detects the number of rotations of the rear wheel output shaft 18, an engine rotation sensor (input side rotation sensor) 56 that detects the number of rotations of the crankshaft 31 (input rpm), a turbine rotation sensor (output side rotation sensor) 57 that detects the number of rotations of the turbine shaft 35 (output rpm), a throttle opening sensor (acceleration request detection means) 58 that detects the amount that the throttle valve is open (acceleration request from the operator), an accelerator opening sensor (acceleration request detection means) 59 that detects the amount that the accelerator pedal has been depressed (acceleration request from the operator), a steering angle sensor 60 that detects the amount that the steering wheel has been turned, and a wheel speed sensor 61 that individually detects the number of rotations of the front and rear wheels 21, 24 are provided as various sensors that are connected to the control unit 53.

The control unit 53 comprises: a CPU for calculating various control signals, ROM for storing various control data and control programs, and RAM for temporarily storing data. In the explanation below, the number of rotations of the front wheel output shaft 16 is referred as the front wheel output shaft rpm Nf, the number of rotations of the rear wheel output shaft 18 is referred as the rear wheel output shaft rpm Nr, the number of rotations of the crank shaft 31 is referred as the engine rpm Ne, the number of rotations of the turbine shaft 35 is referred as the turbine rpm Nt, the amount of opening of the throttle valve is referred as the throttle opening Th, and the amount the accelerator pedal is operated is referred as the accelerator opening Ac.

Figure 4:
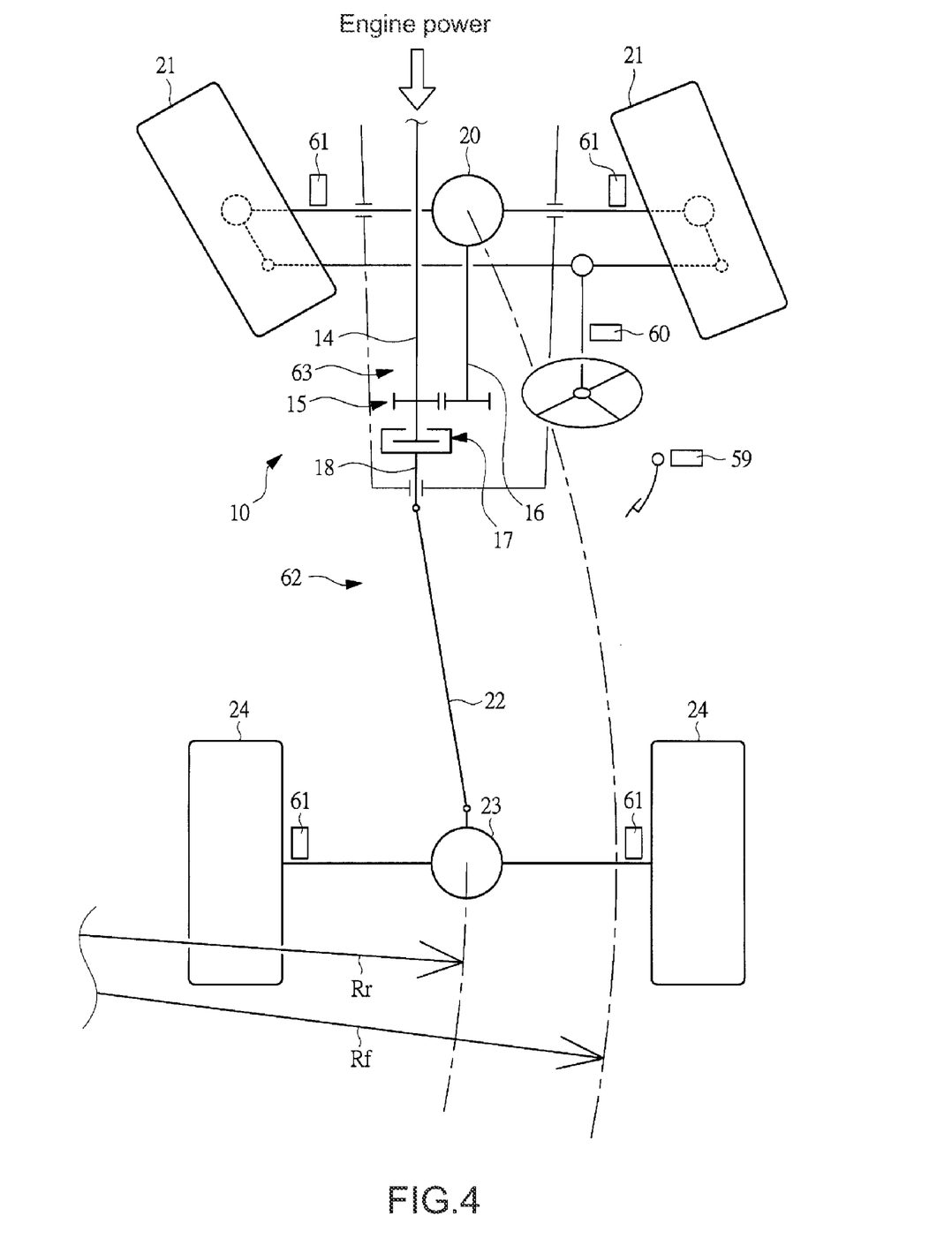
FIG. 4 is an explanatory drawing showing the turning state of a four-wheel drive vehicle.

FIG. 4 is an explanatory drawing showing the turning state of a four-wheel drive vehicle. As shown in FIG. 4, when a vehicle is turning, a difference occurs between the turning radius Rf of the front wheel 21 and the turning radius Rr of the rear wheel 24, so a rotation difference occurs between the front wheel 21 and rear wheel 24. In other words, when a vehicle is turning, it is essential that the transfer clutch 17 absorb the rotation difference between the front and rear wheels 21, 24 by controlling the transfer clutch 17 in the slip state in order that the vehicle will drive smoothly. Therefore, when it is determined that the vehicle is in the turning state based on detection signals from the front wheel rotation sensor 54 and rear wheel rotation sensor 55, the control unit 53 executes slip control of the transfer clutch 17 and controls the fastening force of the transfer clutch 17 based on the turning state, engine torque, gear ratio, and the like.

Here, the pressure of the hydraulic oil that is supplied to the hydraulic chamber 44 of the transfer clutch 17 is regulated so as to alternately switch the clutch pressure control valve 52 between the conductive state and non-conductive state, so the hydraulic pressure fluctuates up and down according to the drive frequency of the clutch pressure control valve 52. In other words, in slip control of the transfer clutch 17 that causes the clutch plate 42 to slip, microscopic fastening and opening of the clutch plate 42 is repeated according to the fluctuation in the hydraulic pressure. This kind of stick slip phenomenon becomes the cause of vibration in the driveline 62 of the rear wheel side, which has small inertia force, however, in certain conditions in which the torque transmission state of the transmission system 13 becomes neutral, it not only becomes the cause of vibration in the driveline 62 of the rear wheel side, but also becomes the cause of vibration in the driveline 63 of the front wheel side. Moreover, vibration of the driveline 63 of the front wheel side causes the transmission system 13, which comprises a plurality of gears, to vibrate, as well as causes abnormal noise to be generated from the transmission system 13. The driveline 62 on the rear wheel side is a driveline that comprises the rear wheel output shaft 18 and the propeller shaft 22, etc. Also, the driveline 63 on the front wheel side is a driveline that comprises the transmission system 13, transmission output shaft 14, gear train 15 and front wheel output shaft 16, etc.

Figure 5:
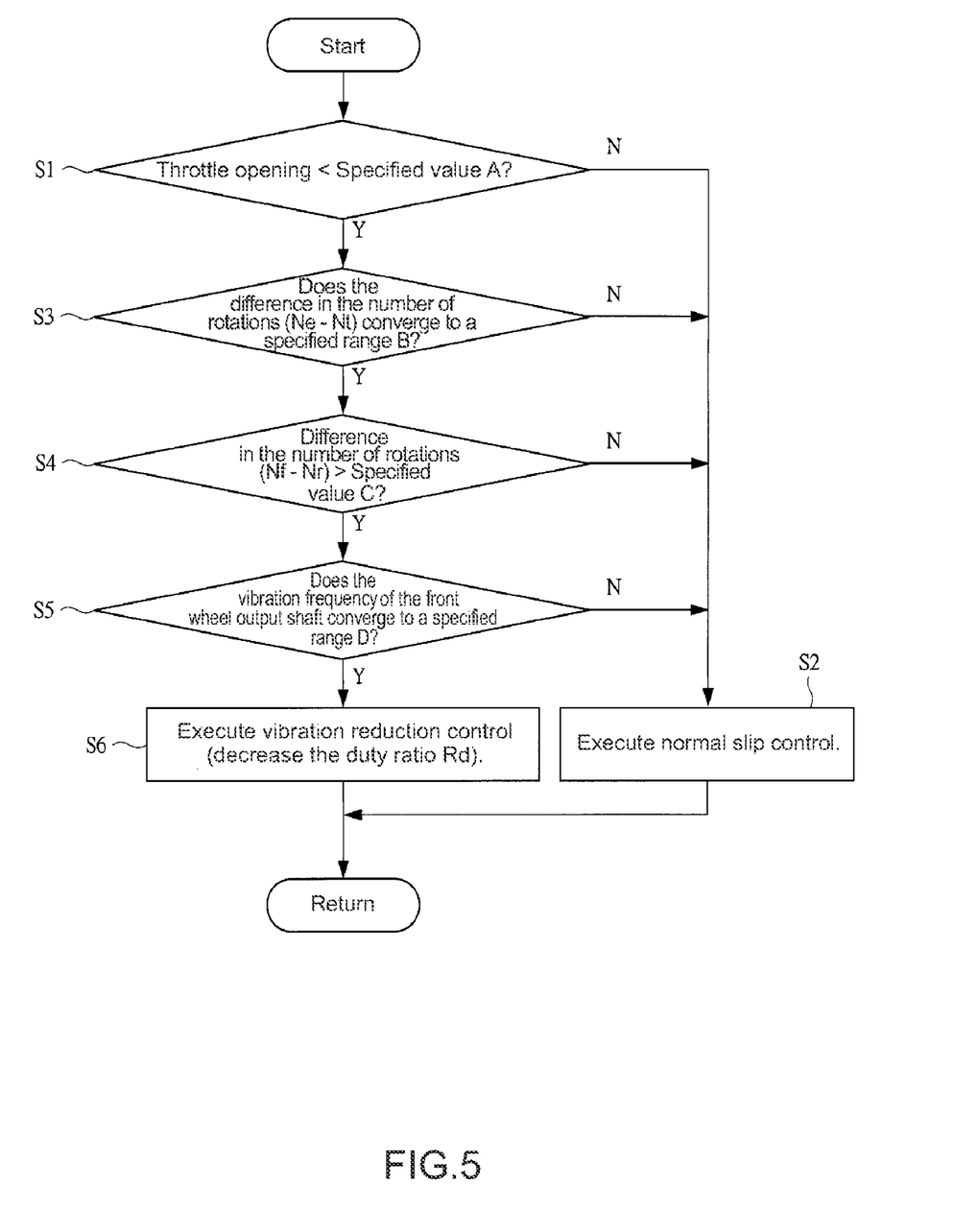
FIG. 5 is a flowchart showing an example of the execution process for vibration reduction control.

Therefore, in order to prevent the generation of abnormal noise that accompanies slip control of the transfer clutch 17, the control unit 53 executes vibration reduction control of the transfer clutch 17. The vibration reduction control of the transfer clutch 17 will be explained below. FIG. 5 is a flowchart showing an example of the execution process for vibration reduction control.

As shown in FIG. 5, in step S1 the control unit 53 determines based on an output signal from the throttle opening sensor 58 whether or not the throttle opening Th is less than a specified value A (for example 5%). When the throttle opening Th is greater than the specified value A, the drive force is being transmitted from the engine 11 to the front wheel output shaft 16 via the transmission system 13, and since a condition does not occur in which the torque transmission state of the transmission system 13 becomes neutral, the control unit 53 advances to step S2, begins executing normal slip control of the transfer clutch 17 and exits the routine. However, in step S1, when the throttle opening Th is less than the specified value A, that is, when the vehicle is not accelerating and is in a state of coasting, a condition in which the torque transmission state of the transmission system 13 becomes neutral is obtained, so the control unit 53 advances to step S3 and determines whether or not the difference in the number of rotations between the engine rpm Ne and the turbine rpm Nt (Ne−Nt) converges to a specified range B (for example, −50 rpm to 50 rpm).

In step S3, when the difference in the number of rotations (Ne−Nt) is determined to be outside the specified range B, the engine rpm Ne and turbine rpm Nt are in a separated state, and the torque transmission state of the transmission system 13 does not become neutral, so the control unit 53 advances to step S2, begins executing normal slip control of the transfer clutch 17 and exits the routine. On the other hand, in step S3, when it is determined that the difference in the number of rotations (Ne−Nt) converges to the specified range B, that is, when the engine rpm Ne and the turbine rpm Nt approach each other beyond a specified value, the torque transmission state of the transmission system 13 is determined to be neutral, so the control unit 53 advances to step S4 and determines whether or not the difference in the number of rotations between front wheel output shaft rpm Nf and rear wheel output shaft rpm Nr (Nf−Nr) is greater than a specified value C (for example, 20 rpm).

In step S4, when it is determined that the difference in the number of rotations (Nf−Nr) is less than the specified value C, the vehicle is not in a turning state in which the stick slip phenomenon occurs in the transfer clutch 17, so the control unit 53 advances to step S2, begins executing normal slip control and exits the routine. On the other hand, in step S4, when it is determined that the difference in the number of rotations (Nf−Nr) is greater than a specified value C, the vehicle is in a turning state in which the stick slip phenomenon occurs in the transfer clutch 17, so the control unit 53 advances to step S5, calculates the vibration frequency (vibration state) of the front wheel output shaft 16 from the front wheel output shaft rpm Nf and determines whether or not that vibration frequency converges to a specified range D (for example, 40 Hz to 60 Hz). The specified range D is a range in which the drive frequency of the clutch pressure control valve 52 (for example, 50 Hz) has a specified width, and is a range that is set based on the drive frequency of the clutch pressure control valve 52.

In step S5, when it is determined that the vibration frequency of the front wheel output shaft 16 does not converge to the specified range D, the condition is not one in which the driveline 63 of the front wheel side vibrates with the stick slip phenomenon, so the control unit 53 advances to step S2, begins executing normal slip control and exits the routine. However, in step S5, when it is determined that the vibration frequency of the front wheel output shaft 16 converges to the specified range D, a condition occurs in which the driveline 63 of the front wheel side vibrates with the stick slip phenomenon, so the control unit 53 advances to step S6, decreases the duty ratio Rd for the clutch pressure control valve 52 a specified amount and decreases the fastening force of the transfer clutch 17.

Moreover, in step S6, after the duty ratio Rd has been decreased, the control unit 53 follows steps S1, S3, S4 and S5 to determine again whether or not there is vibration of the driveline 63 due to the stick slip phenomenon. When it is determined that the vibration of the driveline 63 has been eliminated, the control unit 53 advances to step S2 and begins executing normal slip control, however when it is determined that the vibration of the driveline 63 has not been eliminated, the control unit 53 advances to step S6 and further decreases the fastening force of the transfer clutch 17. By doing this, it is possible to eliminate the stick slip phenomenon of the transfer clutch 17 that brings about the vibration of the driveline 63, and thus it is possible to suppress the generation of abnormal noise that occurs when performing slip control of the transfer clutch 17 when the vehicle is turning.

Moreover, the condition in which abnormal sound of the transmission system 13 is detected by using signals that are output from existing sensors such as the front wheel rotation sensor 54, rear wheel rotation sensor 55, engine rotation sensor 56 and turbine rotation sensor 57, so it is possible to simplify the control system and lower the cost. Furthermore, as shown in step S1 of FIG. 5, when an acceleration request from the operator is recognized from the throttle opening Th, the condition is such that the torque transmission state of the transmission system 13 will not become neutral, so normal slip control is executed without judging other conditions. By doing this, it is possible to avoid judging unnecessary conditions, and thus it is possible to simplify the vibration reduction control. Of course it is also possible to determine an acceleration request from the operator based on the accelerator opening Ac.

Figure 6:
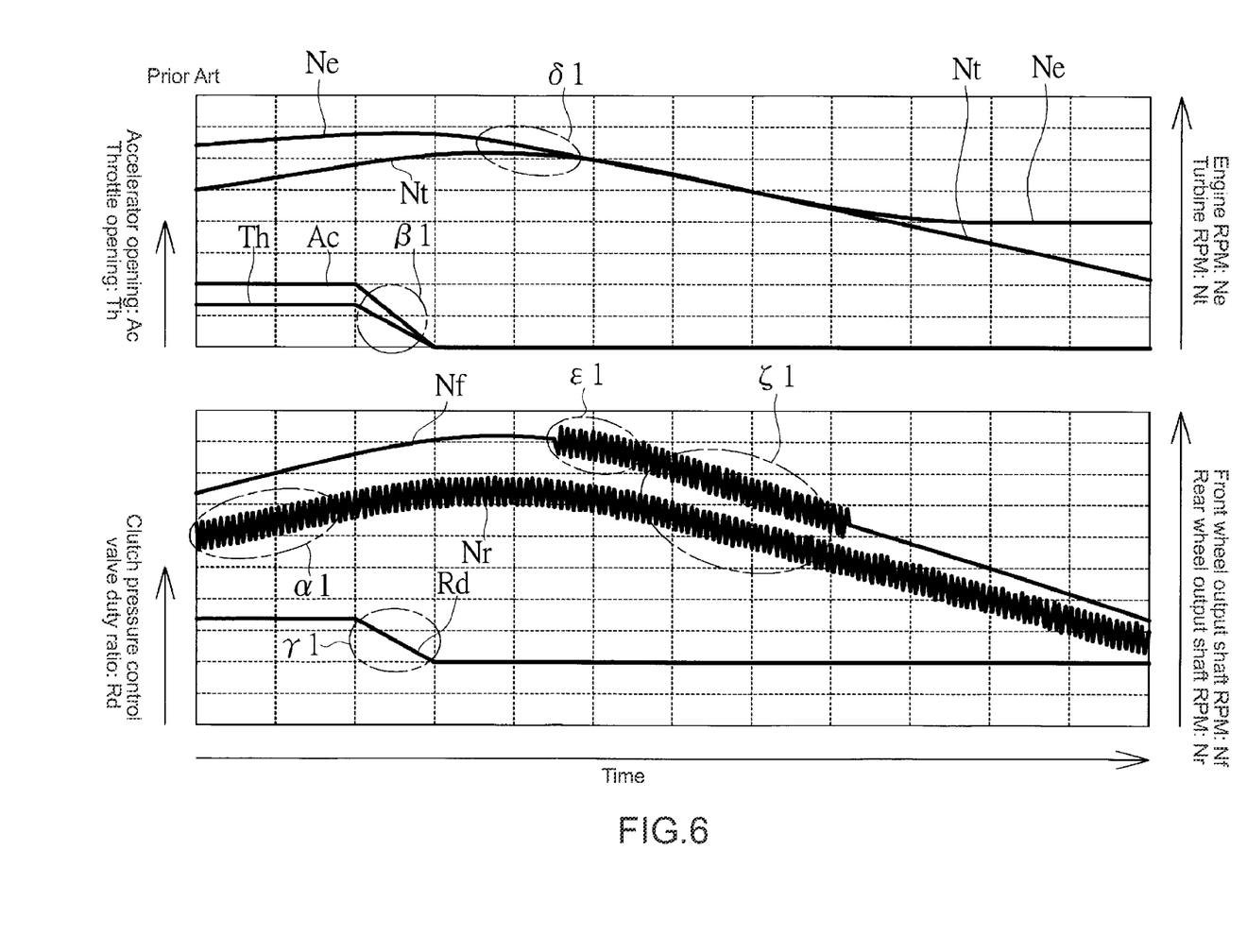
FIG. 6 is an explanatory drawing showing the condition when vibration occurs in the front wheel output shaft due to continuation of normal slip control.
Figure 7:
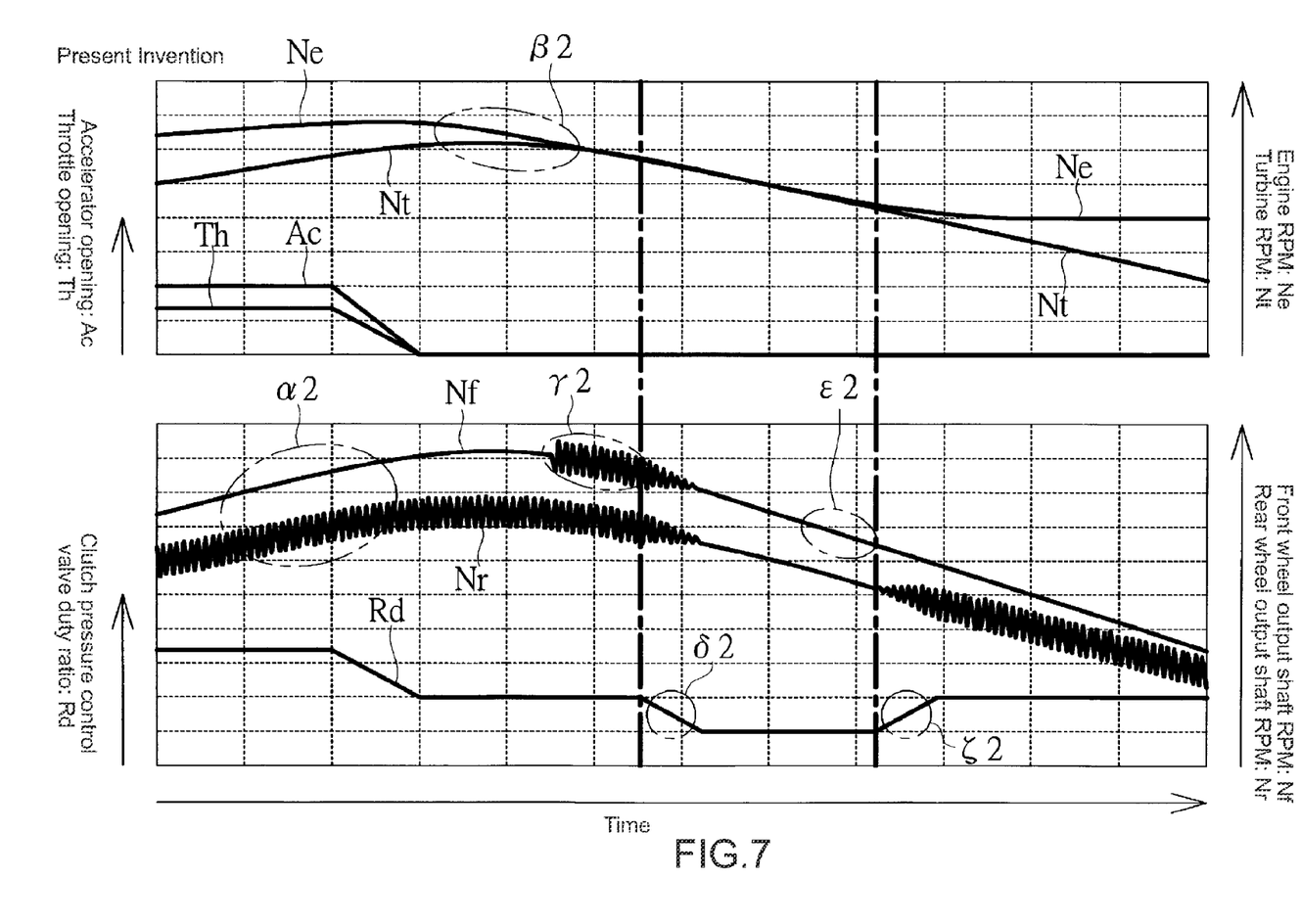
FIG. 7 is an explanatory drawing showing the condition from after switching from slip control to vibration reduction control until vibration of the front-wheel output shaft is eliminated.

FIG. 6 is an explanatory drawing showing the condition when vibration occurs in the front wheel output shaft due to continuation of normal slip control. FIG. 7 is an explanatory drawing showing the condition from after switching from slip control to vibration reduction control until vibration of the front-wheel output shaft 16 is eliminated. Both FIG. 6 and FIG. 7 show a condition in which a pressed accelerator pedal is released during a turn.

First, as shown in FIG. 6, in turning that generates a rotation difference between the front and rear wheels 21, 24, the transfer clutch 17 is controlled in the slip state, so the stick slip phenomenon occurs in the transfer clutch 17 according to the drive frequency of the clutch control valve 52. In addition, due to the occurrence of this stick slip phenomenon, more vibration occurs in the rear wheel output shaft 18 that has small inertia force, than in the front wheel output shaft 16, and vibration at the drive frequency of the clutch control valve 52 appears in the rear wheel output shaft rpm Nr ($\alpha$1). Next, when depression of the accelerator pedal by the operator is released ($\beta$1), and the drive force that is transmitted via the transfer clutch 17 decreases, the duty ratio Rd of the clutch pressure control valve 52 is decreased by normal slip control ($\gamma$1).

Moreover, when the depression of the accelerator pedal by the operator is released ($\beta$1), the engine rpm Ne and turbine rpm Nt approach each other beyond a specified value ($\delta$1) and the torque transmission state of the transmission system 13 become neutral, so a state occurs in which vibration that is brought about by the stick slip phenomenon is transmitted from the front wheel output shaft 16 to the transmission system 13 ($\epsilon$1). In this way, vibration that is caused by the stick slip phenomenon also occurs in the front wheel output shaft 16 in addition to the rear wheel output shaft 18 ($\zeta$1), thus abnormal noise is generated from the transmission system 13 that is linked to the front wheel output shaft 16.

On the other hand, as shown in FIG. 7, in the power transfer device of the present invention, when driving through a turn, the front wheel output shaft rpm Nf and the rear wheel output shaft rpm Nr separate from each other beyond a specified value ($\alpha$2), when the depression of the accelerator pedal by the operator is released, the engine rpm Ne and turbine rpm Nt approach each other beyond a specified value ($\beta$2), and when vibration at a specified vibration frequency appears in the front wheel output shaft rpm Nf ($\gamma$2), vibration reduction control is executed so that the duty ratio Rd of the clutch pressure control valve 52 decreases ($\delta$2). Next, as the duty ratio Rd decreases, when it is determined that vibration in the front wheel output shaft rpm Nf has been eliminated ($\epsilon$2), normal slip control is restored, and control is performed so that the duty ratio Rd is increased again ($\zeta$2). In this way, when vibration occurs in the front wheel output shaft 16 that brings about the generation of abnormal noise from the transmission system 13, the fastening force of the transfer clutch 17 is decreased by vibration reduction control until the vibration in the front wheel output shaft 16 is eliminated, so it is possible to suppress the generation of abnormal noise from the transmission system 13, and thus it is possible to improve the quality of the vehicle.

The present invention is not limited to the embodiment described above, and can be changed within a range that does not depart from the scope of the invention. For example, in the explanation above, by linking the transfer clutch 17 to the rear wheel output shaft 18, the front wheel 21 is made to function as the main drive wheel, and the rear wheel 24 is made to function as the auxiliary drive wheel, however, the invention is not limited to this, and by linking the transfer clutch 17 to the front wheel output shaft 16, the front wheel 21 can be made to function as the auxiliary drive wheel, and the rear wheel 24 can be made to function as the main drive wheel. In this case, the front wheel output shaft 16 functions as the output shaft on the auxiliary drive side, and the rear wheel output shaft 18 functions as the output shaft on the main drive side.

Moreover, in the explanation above, a planetary gear type automatic transmission system was provided as the transmission system 13, however the invention is not limited to this, and it is possible to provide a parallel shaft type automatic transmission system or manual transmission system, or a belt type or toroidal type continuously variable transmission system as the transmission system 13. These kinds of transmission systems as well have construction in which abnormal noise is generated due to vibration, so the present invention can be effectively applied. In addition, in the case shown in the figures a torque converter 30 is provided between the engine 11 and transmission system 13, however the invention is not limited to this, and it is possible to provide an input clutch between the engine 11 and transmission system 13. When this kind of input clutch is released, the torque transmission state of the transmission system 13 becomes neutral and the transmission system 13 vibrates, so the present invention can be effectively applied. Furthermore, in the explanation above, the turning state of the vehicle was determined based on the difference in the number of rotations between the front wheel output shaft rpm Nf and the rear wheel output shaft rpm Nr, however the invention is not limited to this, and it is possible to determine the turning state of the vehicle based on output signals from the steering angle sensor 60 and wheel speed sensor 61.

What is claimed is:

1. A power transfer device that distributes a drive force that is output from a transmission system to a main drive wheel and an auxiliary drive wheel, comprising:
   a main drive side output shaft that is provided between said transmission system and said main drive wheel, and transmits drive force to said main drive wheel;
   an auxiliary drive side output shaft that is provided between said transmission system and said auxiliary drive wheel, and transmits drive force to said auxiliary drive wheel;
   a friction clutch mechanism that is provided between said transmission system and said auxiliary drive side output shaft, and controls the drive force that is distributed to said auxiliary drive wheel; and
   a control unit comprising a vibration judgment section and a clutch control section, wherein
   said vibration judgment section determines a vibration state in said main drive side output shaft based on the rotation state of said main drive side output shaft; and
   said clutch control section decreases the fastening force of said friction clutch mechanism based on the vibration state of said main drive side output shaft, and wherein
   said friction clutch mechanism is a hydraulic clutch mechanism, the fastening force of which is regulated by hydraulic oil whose pressure is regulated by a duty control valve;
   said vibration judgment section calculates the vibration frequency of said main drive side output shaft based on the rotation state of said main drive side output shaft; and
   said clutch control section decreases the fastening force of said friction clutch mechanism when the vibration frequency of said main drive side output shaft converges to a specified range that is set based on the drive frequency of said duty control valve.

2. The power transfer device of claim 1, further comprising:
   a main drive side rotation sensor that detects the number of rotations of said main drive side output shaft; and
   an auxiliary drive side rotation sensor that detects the number of rotations of said auxiliary drive side rotation sensor; wherein
   said clutch control section decreases the fastening force of said friction clutch mechanism based on the vibration state of said main drive side output shaft when the difference in the number of rotations between said main drive side output shaft and said auxiliary drive side output shaft is greater than a specified value.

3. The power transfer device of claim 1, further comprising:
   a torque converter that is provided between a drive source and said transmission system, and transmits drive force from said drive source to said transmission system;
   an input side rotation sensor that detects the number of rotations of the input side of said torque converter; and
   an output side rotation sensor that detects the number of rotations of the output side of said torque converter; wherein
   said clutch control section decreases the fastening force of said friction clutch mechanism based on the vibration state of said main drive side output shaft when the rotation difference between the number of rotations of said input side and the number of rotations of said output side is less than a specified value.

4. The power transfer device of claim 2, further comprising:
   a torque converter that is provided between a drive source and said transmission system, and transmits drive force from said drive source to said transmission system;
   an input side rotation sensor that detects the number of rotations of the input side of said torque converter; and
   an output side rotation sensor that detects the number of rotations of the output side of said torque converter; wherein
   said clutch control section decreases the fastening force of said friction clutch mechanism based on the vibration state of said main drive side output shaft when the rotation difference between the number of rotations of said input side and the number of rotations of said output side is less than a specified value.

5. The power transfer device of claim 1, further comprising a throttle opening sensor that detects an acceleration request from an operator; wherein
   said clutch control section decreases the fastening force of said friction clutch mechanism based on the vibration state of said main drive side output shaft when an acceleration request from an operator is less than a specified value.

6. The power transfer device of claim 2, further comprising a throttle opening sensor that detects an acceleration request from an operator; wherein
   said clutch control section decreases the fastening force of said friction clutch mechanism based on the vibration state of said main drive side output shaft when an acceleration request from an operator is less than a specified value.

7. The power transfer device of claim 3, further comprising a throttle opening sensor that detects an acceleration request from an operator; wherein
   said clutch control section decreases the fastening force of said friction clutch mechanism based on the vibration state of said main drive side output shaft when an acceleration request from an operator is less than a specified value.

8. The power transfer device of claim 4, further comprising a throttle opening sensor that detects an acceleration request from an operator; wherein
   said clutch control section decreases the fastening force of said friction clutch mechanism based on the vibration state of said main drive side output shaft when an acceleration request from an operator is less than a specified value.

* * * * *